F. SKERL.
MONEY CHANGER.
APPLICATION FILED FEB. 5, 1915.

1,279,598.

Patented Sept. 24, 1918.
7 SHEETS—SHEET 1.

Witnesses
H. F. Sadgebury
H. N. Lindsey Jr.

Inventor
Francesco Skerl.
by Earl Benst
Attorneys

F. SKERL.
MONEY CHANGER.
APPLICATION FILED FEB. 5, 1915.

1,279,598.

Patented Sept. 24, 1918.
7 SHEETS—SHEET 5.

Witnesses
H. F. Sadgebury
H. W. Lindsey Jr.

Inventor
Francesco Skerl.
by R. C. Glass
Carl Beust
Attorneys

F. SKERL.
MONEY CHANGER.
APPLICATION FILED FEB. 5, 1915.

1,279,598.

Patented Sept. 24, 1918.
7 SHEETS—SHEET 7.

Witnesses
H. F. Sadgebury
H. W. Lindsey Jr.

Inventor
Francesco Skerl

UNITED STATES PATENT OFFICE.

FRANCESCO SKERL, OF DAYTON, OHIO, ASSIGNOR TO THE NATIONAL CASH REGISTER COMPANY, OF DAYTON, OHIO, A CORPORATION OF OHIO, (INCORPORATED IN 1906.)

MONEY-CHANGER.

1,279,598.            Specification of Letters Patent.      Patented Sept. 24, 1918.

Application filed February 5, 1915. Serial No. 6,238.

*To all whom it may concern:*

Be it known that I, FRANCESCO SKERL, a citizen of Austria, residing at Dayton, in the county of Montgomery and State of Ohio, have invented certain new and useful Improvements in Money-Changers, of which I declare the following to be a full, clear, and exact description.

This invention relates to money changers and the like.

The general object of this invention is to provide a machine particularly adapted for use in booths or ticket stations of theaters, moving picture shows, exhibitions, amusement parks and the like, and also in ticket offices of elevated, subway and other railways as well as other transportation systems. The machine embodying the present invention may in such places be used in connection with automatic ticket or check vending machines which are controlled by inserted coins. The money changer in the preferred form of embodiment disclosed herein is constructed to issue coins of various denominations, the total value of which is equivalent to the inserted coin for which change is desired. The money changer when in use in connection with a ticket or check vending machine would be constructed to that one or more of the coins issued as change were of the proper denominations for controlling the ticket or check vending machine. While in the illustrative form of embodiment disclosed herein the machine is adapted to issue as change coins of certain denominations it is obvious that the machine may be constructed to issue coins of any desired denominations without departing from the scope of the present invention.

The principal object of this invention is to construct a money changer which is simple, effective and practical in operation, as well as cheap in construction.

Another object of this invention is to construct a machine so that the operation of its parts is positive thereby making its operation certain and minimizing the liability of mechanical troubles existing in money changers in which the parts are operated by springs or gravity.

With these and incidental objects in view, the invention consists in certain novel features of construction and combinations of parts, the essential elements of which are set forth in appended claims, and a preferred form of embodiment of which is hereinafter described with reference to the drawings which accompany and form part of the specification.

Of said drawings,—

Fig. 7 the forward portion of one of the plates of the pair is broken away and in Fig. 8 the rear portion of one of the plates of the pair is broken away.

Fig. 12 is a vertical cross section taken through the machine and looking toward the front of the machine. In this view most of the interior mechanism of the machine is omitted, the view being drawn to show the coin chutes and part of the device for displaying the coins and for moving them from displaying position into a coin receptacle. The end of the machine in which the frame containing the coin holders is located is considered in this specification as being the front end of the machine.

In general the machine comprises a plurality of coin holders from which coins are ejected by ejectors which in the preferred form of embodiment disclosed herein are in the form of slides. The coin ejectors are selected for operation by cam slotted arms fast on a shaft. These arms are rocked differentially with the shaft by the movement of coins inserted through slots in the top of the machine, there being one slot for each denomination of coins for which change is issued. The coin slots are so positioned that when a coin is inserted into the machine it passes between a pair of plates and constitutes a connection between the plates during the operation of the machine. One pair of plates is provided for each denomination of coins insertible into the machine. One of the plates of each pair is given an invariable movement by the operating mechanism upon every operation of the machine. The other plate of each pair is supported by a corresponding arm fast to a shaft which is connected to the above mentioned shaft carrying the cam slotted arms. During movement of the invariably movable plates the inserted coin constitutes a connection between the plates of one of the pairs so that the differentially movable plate of the pair together with the differentially movable plates of the other pairs of plates are moved differentially to rock the cam slotted arms differentially and thereby select the coin ejectors for operation. The coin ejectors are selected for operation by these cam slotted arms by connecting them to mechanism given an invariable movement, so that when this mechanism is operated the selected ejectors are operated for the purpose of ejecting the desired change.

In the preferred form of embodiment disclosed herein the machine is adapted to issue change for a dime, a quarter, a half-dollar and a dollar. It is designed to issue two nickels for a dime, two dimes and a nickel for a quarter, a quarter, two dimes, and a nickel for a half-dollar, and a half-dollar, a quarter, two dimes and a nickel for a dollar. It is of course to be understood that a machine may readily be constructed in accordance with the present invention to issue change for coins for other than those stated above and also that the denominations of the coins issued as change may be varied as desired without constituting departure from the scope of the present invention.

Figure 12:
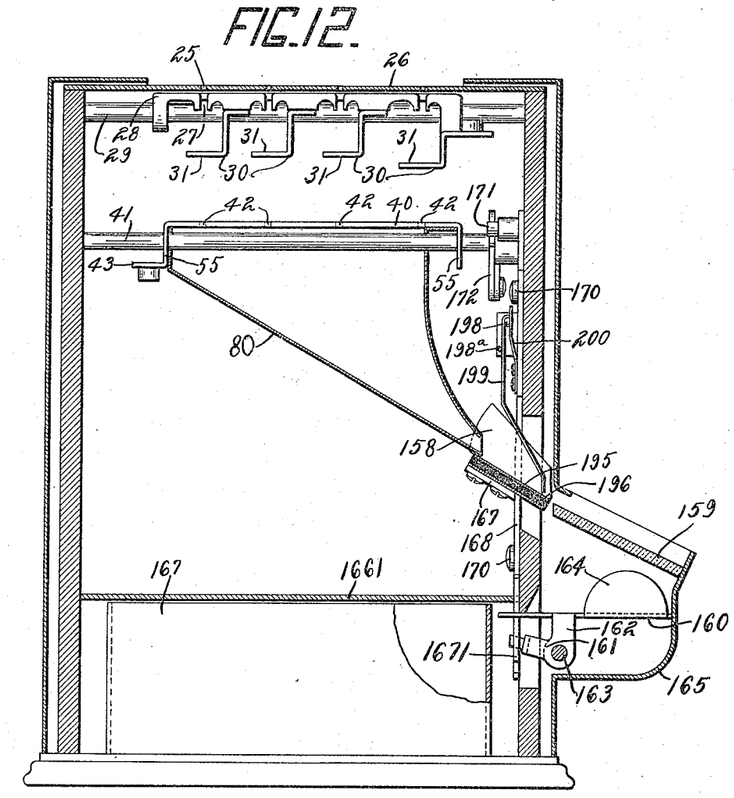
Figure 14:
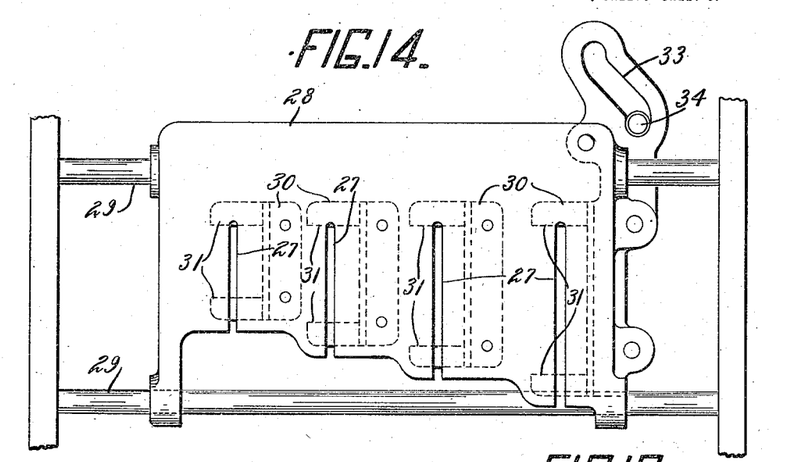
Fig. 14 is a top plan detail view of the plate carrying devices for arresting the coins to be changed upon their insertion into the machine.

Referring more particularly to Fig. 12, the coins for which change is desired are inserted through slots 25 in a plate 26 supported on the side frames of the machine. The inserted coins pass through slots 27 (Figs. 12 and 14) formed in a horizontal plate 28 which is slidably mounted on two parallel cross bars 29 supported at their ends in the side frames of the machine. The plate 28 on its under side rigidly carries four members 30, each of which has two fingers 31. The distance between the fingers of each member is slightly less than the diameter of a coin to be inserted in the slot 27 above the fingers so that the fingers serve to arrest the coins upon insertion of the latter. The fingers 31 are so positioned that when a coin is arrested thereby the upper portion of the coin has passed completely through the slot 27, the coin being retained in a vertical position on the fingers, by means to be described presently.

The member 30, having the fingers for arresting an inserted dollar, is of a different shape than of the members for the coins of the remaining denominations as it is provided with a projecting portion having a cam slot 33 (Figs. 1 and 14) through which a roller 34 mounted on the upper flange end of an arm 35 (Figs. 1 and 4) projects. The arm 35 is rigidly mounted on a shaft 36 and carries a roller (Fig. 15) normally projecting into a set off 37 formed in the inner side of a cam groove formed in the face of a disk 38, which is rigidly mounted on a main drive shaft 39. The shaft 39 is rotated in the direction of the arrow and given one complete rotation upon each operation of the machine. No means is shown in the drawings for rotating this shaft as such means is not essential to the understanding of the invention and it is obvious that any means, such as a crank handle, may be employed for this purpose. The cam groove into which the roller on the arm 35 projects is designed to rock the arm 35 slightly forwardly at the very beginning of the operation of the machine and the roller 34 through its coöperation in the slot 33 moves the plate 28 slightly toward the right as viewed in Fig. 14. The plate 28 is retained in this position for a short time and is then moved farther toward the right as viewed in Fig. 14 by the further rocking movement of the arm 35 effected by the cam groove in the disk 38. In this manner the fingers 31 are withdrawn from under the inserted coin upon the second movement of the plate, the first movement of the plate being sufficient to move the slots 27 away from under the slots 25 and thereby prevent the insertion of a coin after the machine has begun to operate.

Figures 1, 2, 3:
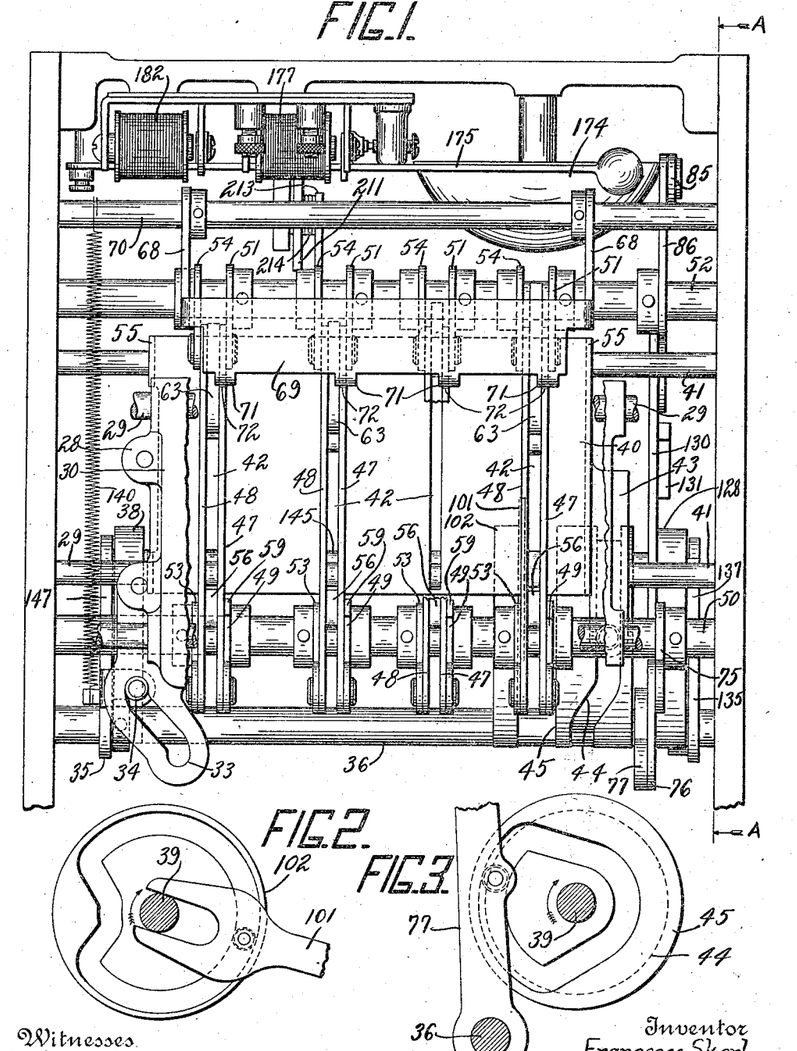
Figure 1 is a top plan view of the machine, embodying the present invention, the frame containing the coin holders and the cabinet being removed, and the device for arresting the coins being broken away to expose the mechanism of the machine more clearly to view.
Fig. 2 is a detail view of the cam and part of the pitman employed to operate the coin ejectors.
Fig. 3 is a detail view of the cam and arm employed to operate the differential mechanism of the machine under the control of the inserted coins.
Figure 4:
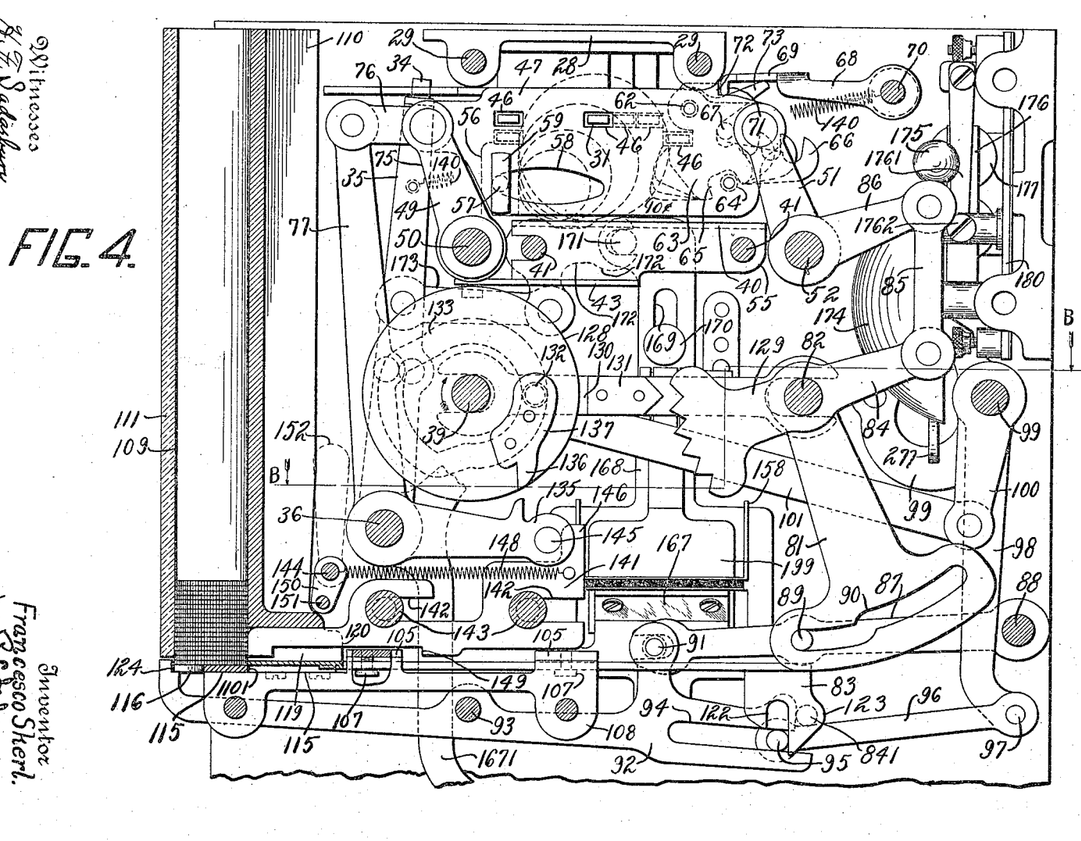
Fig. 4 is a transverse vertical section taken on the line A—A of Fig. 1, the bottom portion of the machine being broken away. This section line A—A is also shown in Fig. 5.

When the fingers 31 are withdrawn from under the coins, as above described, the latter drop a slight distance until they are arrested by engagement with a horizontal plate 40 (Figs. 1, 4 and 12). The plate 40 has downwardly extending flanges or bent portions 55 and two parallel cross rods 41 pass through the flanges so that the plate may be slid on the rods. The plate is provided with four slots 42 (Figs. 1 and 12) which are normally in the same vertical planes as the corresponding slots 25 and 27 in the plates 26 and 28, respectively, and before the fingers 31 are withdrawn from under the inserted coin the plate 40 is slid on the cross rods 41 toward the left, as viewed in Fig. 1, to prevent the coin from passing through the slot which is thereunder when the coin is inserted. To this end the right hand vertical flange 55 of the plate 40 has a horizontal flange 43 (Figs. 1, 4 and 12) which carries a roller on its forward lower side normally projecting into a cam groove 44 (Fig. 1) formed in the periphery of a cam disk 45 rigidly mounted on the main drive shaft 39. The cam groove 44 is so designed as to shift the plate 40 slightly toward the left after the plate 28 has been moved slightly in the same direction but before the plate 28 is given its second movement as above described.

A pair of parallel and vertical plates 47 and 48 (Figs. 1, 4, 6, 7 and 8) is provided for each denomination of coins for which the machine is designed to issue change. The plates of each pair are so positioned that the coins inserted through the corresponding slot 25 pass between the plates. Each pair of plates serves to retain the coin inserted between them in vertical positions on the fingers 31 and plate 40. The fingers 31 project through slots 46 formed in the plates 47 and 48 and when the plate 40 is moved toward the left (Fig. 1), as above described, the fingers are withdrawn out of the slots and from under the inserted coin. The plates 47 are pivoted at their forward ends on corresponding arms 49 (Figs. 1, 6 and 8) loose on a shaft 50 and the rear ends of the plates are pivoted to corresponding arms 51 (Figs. 1, 6 and 7) fast on a shaft 52. The plates 48 (Figs. 1 and 7) at their forward ends are pivotally supported by corresponding arms 53 fast on the shaft 50 and the rear ends of these plates are pivotally supported on corresponding arms 54 loosely mounted on the shaft 52. Rigidly mounted on the right side of each plate 48 is a block 56 (Figs. 1, 4, 6, 7 and 8) having a pin 57 projecting through an oval shaped slot 58 formed in the companion plate 47. Each pin 57 to the right of the plate 47 carries a block 59 there being sufficient space between the blocks 56 and 59 to permit free reciprocatory movement of the plates 48 relative to the plates 47, the pin 57 and block 59 being provided to maintain a constant distance between the plates of each pair, and to restore the plates 47 to normal position as will be described later.

Loosely mounted on a pin 62 carried by each plate 47 is a pawl 63 (Figs. 1, 4, 6, 7 and 8). A pin 64 on each of the plates 47 projects into a notch or recess 65 formed in the corresponding pawl 63. Each pawl is provided with a projection or finger 66 adapted to coöperate with a pin 67 carried by the adjacent plate 48. A locking frame comprising side arms 68 (Figs. 1 and 4) integral with a horizontal plate 69 is rigidly mounted on a shaft 70. The plate 69 is provided with four downwardly extending flanges 71 which normally rest on the plates 47 and in front of shoulder 72 formed on these plates. Each pawl 63 also carries a finger 73 which normally engages the under side of the plate 69 of the locking frame.

Rigidly mounted on the shaft 50 is an arm 75 (Figs. 1 and 4) which at its upper end is connected by a link 76 to the upper end of an arm 77 loosely mounted on the shaft 36. As shown in Fig. 3 the arm 77 carries a roller projecting into the cam groove formed in the face of the disk 45 rigidly mounted on the drive shaft 39.

The operation of the above described mechanism is as follows:—Immediately after the fingers 31 (Fig. 14) have been withdrawn from under an inserted coin and the coin is arrested by the plate 40 (Figs. 1 and 4) the arm 77 is rocked rearwardly by the cam groove shown in Fig. 3, thereby rocking the arm 75 and shaft 50 clockwise. As the arms 53 are fast on the shaft 50, it can be seen that the four plates 48 are moved rearwardly an invariable distance, independently of the plates 47, if a coin has not been inserted, the arms 49 supporting the forward ends of the plates 47 being loose on shaft 50 and the arms 54 supporting the rear ends of the plates 48 being loose on the shaft 52.

If, however, a coin has been inserted, it serves as clutching means between the plates 47 and 48 and these plates will move together a distance depending on the denomination of the inserted coin. The plates 47 and 48 will move together about one fourth part of the invariable stroke of the plate 48, or one step of movement when a dime is inserted, two steps of movement when a quarter, three steps of movement when a 50 cent piece and four steps of movement when a dollar is deposited. If, for instance, a dime has been inserted the block 56 of the corresponding plate 48 will upon its rearward movement engage the dime and move it rearwardly until near the end of the third step of movement the dime will strike the corresponding pawl 63 (indicated by the 10¢ mark in Fig. 4) rocking the latter counter clockwise (Fig. 4) until the forward end of its notch 65 engages the pin 64 projecting into the notch and in this position of the pawl its projection 66 is engaged by the corresponding pin 67, the plates between which the dime is inserted being locked together in this manner. These pins 64 and 67 and the pawl 63 serve to lock the plates together as the plate 48 cannot be moved rearwardly relatively to the plate 47 after the pawl 63 has been rocked counter clockwise because of the engagement of the pin 67 with the finger 66 and the plate 47 cannot be moved rearwardly by the momentum of the plate 47 relatively to the plate 48 because of the engagement of the forward side of a notch 65 with the pin 64. As the plates 47 and 48 between which the dime rests are locked together at the end of the third step of movement of the plates 48 it can be seen that the plates 47 are moved one step rearwardly with the plates 48 during the last step of movement of the plates 48. As the arms 51 supporting the rear ends of the plates 47 are all fast on the shaft 52 it is obvious that the plates 47 move as a unit.

Figure 6:
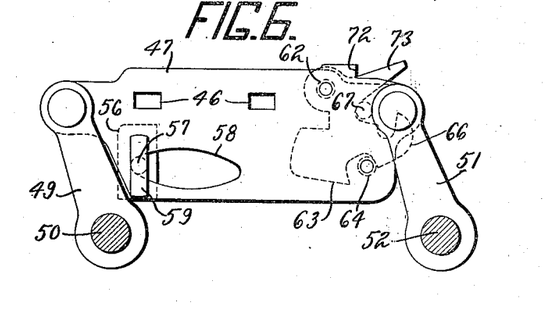
Figs. 6, 7 and 8 are detail views of the pairs of parallel plates, between which quarters, half dollars and dollars respectively are inserted.

When a quarter is inserted into the machine and the machine operated the plates 48 move rearwardly and near the end of the second step of movement of these plates the coin engages and rocks the pawl 63 Fig. 6 in front of the quarter in the same manner as the dime rocks the corresponding pawl as above described. It can therefore be seen that during the last two steps of movement of the plates 48, the plates 47 are moved rearwardly two steps and that they rock the shaft 52 a corresponding extent.

Figure 7:
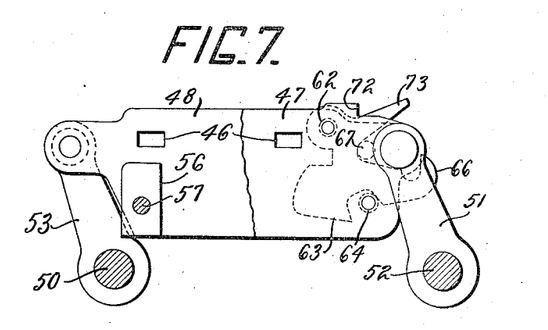
Figure 8:
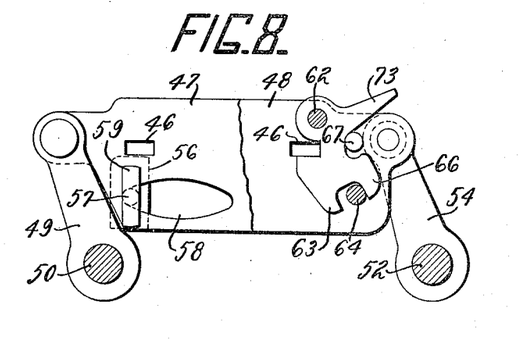
Figure 9:
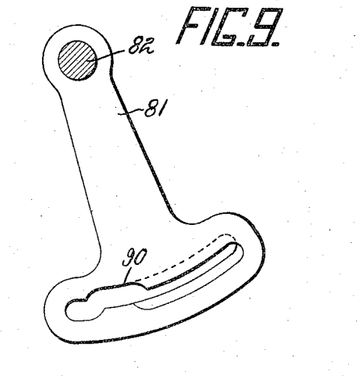
Figs. 9, 10 and 11 are detail views respectively of the cam slotted arms for controlling the operation of the nickel, quarter and half dollar coin ejectors.
Figure 10:
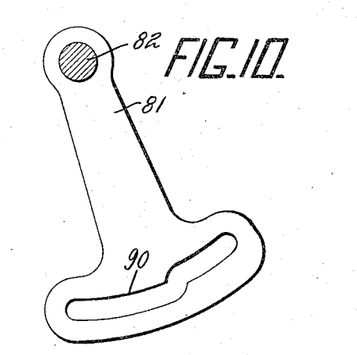
Figure 11:
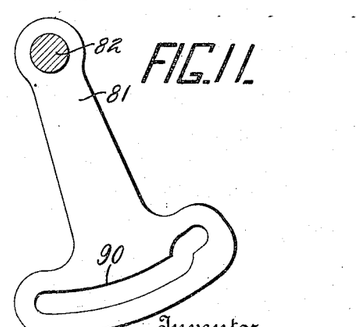

In the same manner a half-dollar and a dollar rock the shaft 52 clockwise, as viewed in Fig. 4, three and four steps respectively. Figs. 7 and 8 respectively show the pairs of plates between which half-dollars and dollars are inserted and between which the pawls 63 operated by these coins are mounted on plates 47. In this way the shaft 52 is rocked differentially under the control of the inserted coins to determine the change to be ejected as will be described more fully later.

Each of the pawls 63 as above described has a finger 73 engaging the under side of the locking plate 69 (Figs. 1 and 4) so that when a pawl 63 is rocked counter clockwise as above described it raises the locking plate 69 to permit movement of the plates 47, it being understood that all of the plates 47 move as a unit as their supporting arms 51 are rigidly mounted on the shaft 52. If a coin has not been inserted in the machine before the machine is operated the locking plate 69 remains in locking position to lock the plates 47 against movement.

After the plates 47 have been moved rearwardly and while they are retained in such positions the cam groove 44 formed in the periphery of the disk 45 (Fig. 1) shifts the plate 40 toward the right as viewed in Fig. 1 to normal position to permit the inserted coin to drop through one of the slots 42 in the plate, after which the coin passes through a chute 80 (Fig. 12) which will later be described more fully. The cam groove shown in Fig. 3 then restores the arm 77, the arm 75, the arms 53, and the plates 48 to normal position. During the forward movement of the plates 48 to normal position the pins 57 engage the forward ends of the slots 58 in the plates 47 and restore the latter to their normal position.

Figure 5:
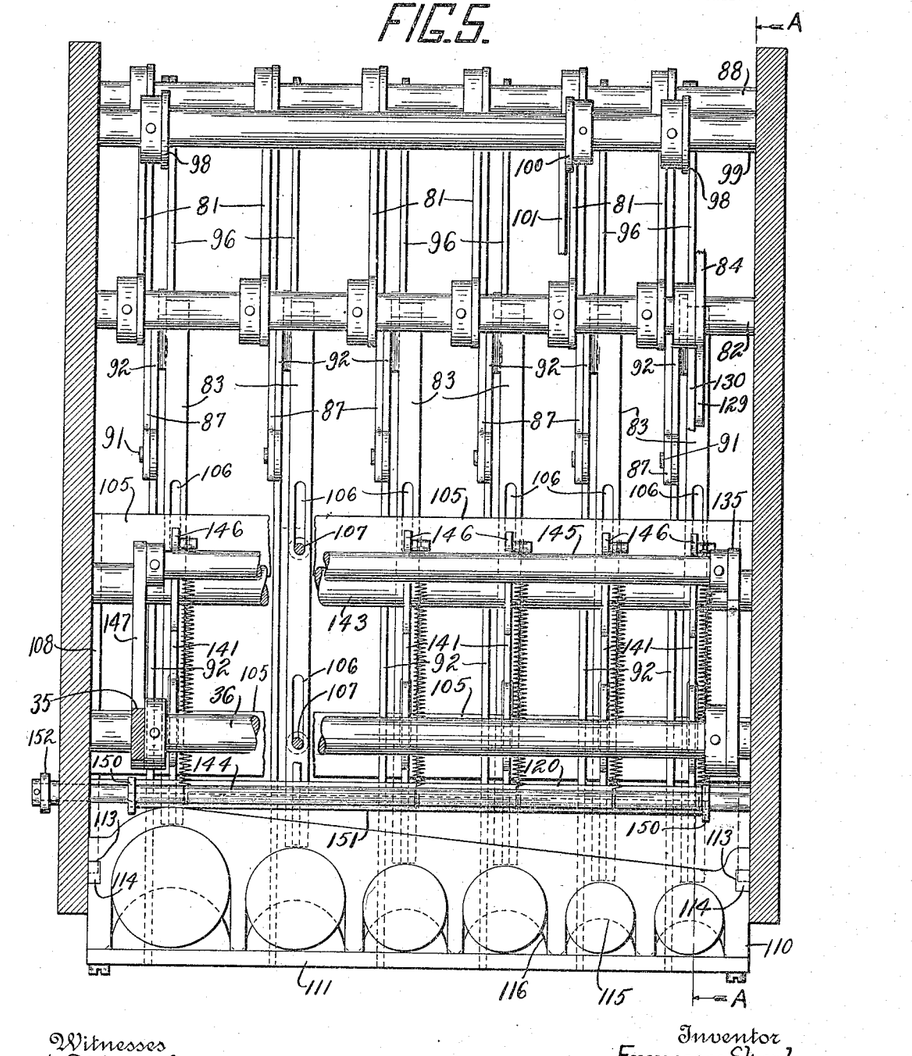
Fig. 5 is a horizontal cross section taken on the line B—B of Fig. 4, the frame containing the coin holders being shown in full.

Six cam slotted arms 81 (Figs. 4, 5, 9, 10 and 11) fast on a shaft 82 are employed to select coin ejectors 83 for operation as will now be described. Fast on the shaft 82 is a lever 84 the rearwardly extending arm (Fig. 4) of which is connected by a link 85 to an arm 86 fast on the shaft 52 so that the differential movement given to the shaft 52, as above described, is transmitted to the shaft 82 to rock the cam arms 81 forwardly a corresponding extent. Arms 87 (Figs. 4 and 5) one for each of the cam arms 81 are loosely mounted on a cross rod 88 and intermediate the ends of each arm 87 is a pin 89 (Fig. 4) normally projecting into the forward end of a cam slot 90 formed in the corresponding arm 81. The forward end of each arm 87 is bifurcated and straddles a pin 91 on a corresponding lever 92, all of the levers 92 being loosely mounted on a cross rod 93 supported in the side frames of the machine. The rear end of each of the levers 92 is provided with a recess 94 into which a pin 95 carried on the forward end of a corresponding link 96 projects. The links 96 at their rear ends are loosely mounted on a cross bar 97, supported by the lower ends of two arms 98 rigidly mounted on a shaft 99. A downwardly extending arm 100 is fast on the shaft 99 and at its lower end is pivotally connected to a pitman 101. The forward end of the pitman is forked to straddle the drive shaft 39 (Fig. 2) and the pitman also carries a roller projecting into a cam groove formed in the face of a disk 102 rigidly mounted on the shaft 39.

There are six coin ejectors 83 which are in the form of slides slidably mounted on the under side of two cross bars 105, (Figs. 4 and 5) the ejectors being provided with slots 106 (Fig. 5) through which headed pins 107 (Fig. 4) carried by the bars, project. The cross rods 105 are supported at their ends on frames or brackets 108 rigidly mounted to the side frames of the machine. There are six coin holders 109, (Figs. 4 and 5) one for each coin ejector 83. Two of the coin holders are for nickels, two for dimes, one for quarters and one for half-dollars. The coin holders are vertical recesses or grooves formed in the front portion of a solid frame 110. A glass plate 111 forms the front wall of the coin holders, glass being employed so that it can readily be seen when the coin holders need replenishing. The cabinet of the machine may be cut away in front of the coin holders if so desired, so that the holders may be viewed without removing the cabinet. Vertical grooves 113 are cut in the sides of the frame 110 and vertical guides 114 rigidly mounted on the side frames of the machine fit in the grooves. In this way the frame 110 may be removed from the machine by merely being lifted out of the machine, the grooves 113 sliding away from the guides 114.

The coins (shown by the circles in Fig. 5) in the holders rest on a horizontal plate 115 (Figs. 4 and 5) which is fastened to the under side of the frame 110 by screws as shown in Fig. 4. The forward edge of the plate 115 has semicircular notches 116 the radii of which are slightly greater than the radius of coins, so that when an ejector 83 is pushed forwardly, as will be described presently, it engages the bottom coin in the corresponding holder and moves it forwardly until it drops through the notch 116, the coin then passing in to a container or receptacle (not shown) from which it is withdrawn by the person inserting the coin to be changed. The glass plate 111 is cut away (not shown) at its bottom edge to permit the ejection of the coins. The container or receptacle (not shown) is mounted on the cabinet of the machine, an opening being provided in the cabinet so that the coins may be ejected into the container. The coin ejectors pass through grooves 119 (Fig. 4) cut in the under side of a cross bar 120 which is integral with and forms part of the frame 110, so that the frame 110 may be raised to remove it from the machine when desired. The plate 115, which is fastened to the frame 110, also has slots or notches 1101 (Fig. 4) normally under the forward ends of the coin ejectors to permit removal of the frame 110.

The operation of the ejecting mechanism above described is as follows:—As already stated, the shaft 82 and the cam slotted arms 81 are rocked forwardly one, two, three or four steps when a dime, quarter, half-dollar or dollar, respectively, has been inserted into the machine and the machine operated. The slots 90 in the two cam arms 81 (Fig. 9) for the nickel coin ejectors are so formed that when they are rocked forward one step the pins 89 on the corresponding arms 87 are raised to rock these arms 87 upwardly and thereby rock the corresponding levers 92 counter clockwise as viewed in Fig. 4. The slots 90 in the four other cam arms 81, however, do not rock their arms 87 upwardly when the arms 81 are moved but one step. The movement of the levers 92 for the nickel coin ejectors raises the pins 95 projecting into their slots 94 into notches 122 formed in downwardly turned flanges 123 on the ejectors. The rocking of these levers 92 also carries shoulders 124 formed on the forward ends of the levers away from in front of the bottom nickel in each of the nickel coin holders. After the arms 81 are differentially positioned, the cam groove, shown in Fig. 2, through the pitman 101, arm 100, and shaft 99, rocks the arms 98 and the rod 97 forwardly an invariable extent. As the pins 95 on the links 96 for the two nickel coin ejectors engage in the notch 122 in these ejectors, it can be seen that the latter are moved forwardly to engage the bottom nickel in each nickel coin holder and eject the same, the pins 95 being guided in the slots 94. As the links 96 for the dime, quarter, and half-dollar coin ejectors have not been raised when a dime is inserted into the machine these coin ejectors are not operated, the corresponding pins 95 moving idly in the slots 94 in the corresponding levers 92 during the operation of the two nickel coin ejectors.

When a quarter is inserted and the machine operated, the cam arms 81 are rocked forwardly two steps as already described. The slots 90 (Fig. 4) in the two arms 81 for the dime ejectors have the same construction and are designed to raise their corresponding arms 87 and rock their corresponding levers 92 to raise the pins 95 projecting into the slots 94 in the levers 92 into engagement with the notches 122 in the dime coin ejectors when the arms 81 are moved two steps. These slots are also designed to retain the pins 95 in engagement with the notches 122 of the two dime coin ejectors during the third and fourth steps of movement of the arms 81, when a half-dollar or dollar respectively has been inserted. The slot 90 (shown in full lines in Fig. 9) in the arm 81 for the right hand nickel coin ejector returns the corresponding arm 87, lever 92, and link 96 to normal position at the beginning of the second step of movement of the arms 81 and serves to retain these members in normal position during the second, third and fourth steps of movement of the arms 81. The slot 90 in the arm 81 for the left hand nickel coin ejector however serves to retain the corresponding pin 95 in engagement with the notch 122 in the left hand coin ejector during the second, third and fourth steps of movement of the arms 81. The slot 90 in the arm 81 for the left hand nickel ejector is partly shown in dotted lines in Fig. 9. The cam slots 90 in the arms 81 for the half-dollar and dollar coin ejectors do not raise their arms 87 when a quarter is inserted. It can be seen from the above description that pins 95 are raised and retained in engagement with the notches 122 in only the dime coin ejectors and one nickel coin ejector when a quarter is inserted into the machine and therefore only these three coin ejectors are pushed forwardly when the rod 97 is moved forwardly by the cam shown in Fig. 2. Two dimes and a nickel are therefore issued for a quarter.

When a half-dollar is inserted the arms 81 are moved three steps and pins 95 are retained in engagement with the notches 122 in the two dime coin ejectors and in the one nickel coin ejector. The cam arm 81, shown in Fig. 10, also raises the pin 95 on the link 96 for the quarter coin ejector into engagement with the notch 122 in this ejector. Therefore, when a half-dollar is inserted and the machine operated the quarter and the two dime ejectors and one nickel ejector are moved forwardly to eject a quarter, two dimes and a nickel.

When a dollar is inserted the arms 81 are moved four steps and the pins 95 for one nickel, the two dime, and the quarter coin ejectors are retained in engagement with the notches 122 in these ejectors and the pin 95 on the link 96 for the half-dollar coin ejector is raised into engagement with the notch 122 in the latter. Therefore, when the rod 97 is moved forwardly when a dollar has been inserted all but one nickel coin ejector is operated to eject a half-dollar, a quarter, two dimes and a nickel.

It can be seen from the above description that the arms 81 are moved differentially as a unit, the slots 90 in the arms 81 being designed to couple selectively the coin ejectors to the operating mechanism to issue change in accordance to the denomination of the coin inserted into the machine. After the coins are ejected from the holders the bar 97 and links 96 are moved rearwardly by the cam, shown in Fig. 2, to normal position and as the pins 95 engage the rear walls of the notches 122 of operated coin ejectors during this return movement the operated coin ejectors are restored to normal position at the same time. Finally when the cam arms 81 move rearwardly to their normal position upon return movement of the shaft 52 to normal position, as above described, the arms 87 are rocked downwardly to lower the pins 95 out of engagement with the notches 122 in the operated coin ejectors. The downwardly extending flange 83 of each coin ejector carries a pin 841 which normally engages the rear end of the corresponding lever 92. When a lever 92 is rocked to couple the corresponding coin ejector to the operating mechanism, the slot 94 in the lever is raised so that during movement of the coin ejector the pin 841 moves in the slot 94. As the pin 841 engages the end of the corresponding lever 92 when the lever is not raised it can be seen that the coin ejector is positively locked from moving forwardly when it is not selected for operation.

For the purpose of alining the cam arms 81 in their differentially moved positions during the operation of the selected coin ejectors a forwardly extending arm 129 of the lever 84 has V shaped notches formed in its forward edge. A pitman 130, carrying a block 131 having a wedge shaped end for coöperating with the notches in the arm 129, is slotted at its ends to straddle the shafts 39 and 82. The pitman 130 near its forward end carries a roller 132 projecting into a cam groove 133 formed in the left hand face of a cam disk 128 fast on the drive shaft 39. The cam groove 133 is so designed as to move the pitman forwardly immediately after the plates 48 have reached the limit of their rearward movement to move the wedge shaped end of the block 131 into engagement with one of the notches in the arm 129 and thereby lock and aline the arms 81 and the associated mechanism in moved positions. After the coin ejectors have been to return the plates 48 to normal position, and before the cam, shown in Fig. 3, begins to return the plates 48 to normal position, the cam groove 133 moves the pitman 130 forwardly to carry the block 131 to normal position out of engagement with the notches in the arm 129.

*Locking mechanism.*

In order to stop the machine at the end of each operation, an arm 135 fast on the shaft 36 has an upwardly extending finger for coöperating with a finger 136 on a block 137, which is rigidly mounted on the right hand face of the cam disk 128. During the rotation of the drive shaft 39, the shaft 36 is rocked counter clockwise, as viewed in Figs. 4 and 15, through the rocking of the arm 35 by the cam groove, shown in Fig. 15, as already described, and thereby the arm 135 is raised so that its finger is in the path of movement of and engages the finger 136 on the block 137 at the end of each complete rotation of the shaft 39, that is, at the end of each operation of the machine. This engagement occurs when the roller (Fig. 15) on the arm 35 arrives opposite the notch 37 formed in the cam groove in the disk 38, the groove being wider at this point because of the notch 37. After the machine has been stopped in this manner a spring 140 (Figs. 1 and 4) which is secured at one end to the shaft 70 and at its opposite end to the arm 35, draws the arm 35 rearwardly to normal position and thereby moves the roller on the arm 35 into the notch 37. This movement of the arm 35 rocks the shaft 36 and thereby rocks the arm 135 clockwise (Fig. 4) to normal position to carry the finger on the latter out of engagement with the finger on the block 137 and thereby unlock the machine to permit a subsequent operation of the machine.

Means are provided for preventing the arm 135 from rocking clockwise to normal position at the end of the operation of the machine when but one coin remains in a coin receptacle. This means comprises sliding plates 141 (Figs. 4 and 5) having guiding sloth 142 (Fig. 4) through which cross rods 143 pass. The plates 141 move in restricted portions of the rods 143 so that they cannot be displaced longitudinally of the rods. There is one of these plates 141 for each coin holder and springs 148 connected at their rear ends to the plates 141 and at their forward ends to a shaft 144, normally retain the forward ends of the plates 141 in engagement with several coins in the holders including the second coins from the bottom. A cross rod 145 passes over the plates 141 and is normally in front of upwardly extending portions 146 of the plates 141. This cross rod 145 is supported by the arm 135 and a rearwardly extending arm 147 (Fig. 1) which together with the arm 35 forms a bell crank lever. It can be seen from this construction that when two coins are in a holder at the beginning of an operation of the machine and one of these coins is ejected during that operation, the spring 148 draws the plate 141 for the particular coin holder forwardly, when the rod 145 is raised by the arms 135 and 147, until a shoulder 149 on the lower edge of the plate 141 engages the forward cross plate 105 which serves to limit the forward movement of the plates 141. The upper end of the vertically extending portion 146 of the moved plate 141 is thereby moved forwardly under the rod 145 thereby preventing return movement of the arm 135 to normal position and locking the machine against operation until the plate 141 is returned to normal position to permit the movement of the arm 135 out of locking position.

For the purpose of moving the operated plate 141 rearwardly to unlock the machine and to permit the coin holder to be replenished the shaft 144 carries two downwardly extending arms 150 supporting a cross rod 151. The cross rod 151 is normally in position to permit forward movement of the plates 141. An operating lever 152 (Figs. 4 and 5) is fast on the shaft to the left hand side of the left hand frame of the machine and may be reached either by removing the cabinet or through a door (not shown) cut in the cabinet, if desired. To restore the moved plate 141 to normal position the lever 152 is moved forwardly thereby swinging the cross rod 151 rearwardly to engage the plate 141 and restore it to normal position, thereby withdrawing the forward end of the plate out of the coin receptacle. As soon as the moved plate 141 is restored to normal position the spring 140, as above described, rocks the arm 35 and shaft 36 to restore the arm 135 to normal position and thereby unlock the machine.

*Full stroke device.*

Figures 15, 16, 17:
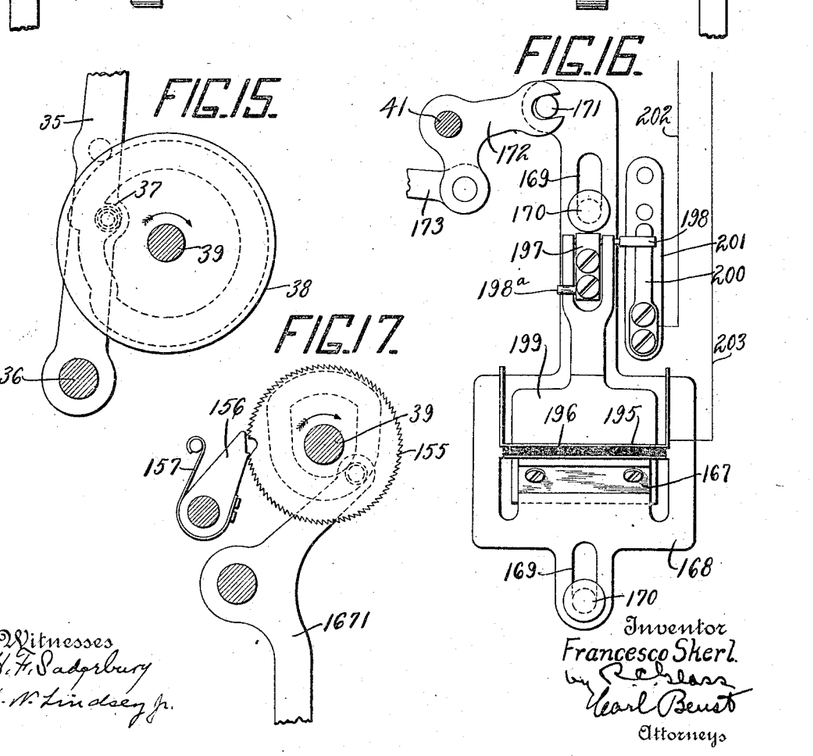
Fig. 15 is a detail view showing the cam and part of the arm for operating the plate shown in Fig. 14.
Fig. 16 is a detail side view of the slidable frame carrying one of the coin chutes and a contact device for the alarm mechanism.
Fig. 17 is a detail view showing the full stroke device for compelling the complete operation of the machine and for preventing backward rotation of the operating device and also shows the cam groove for operating the displaying device, shown in Figs. 12 and 13.

Fig. 17 shows a full stroke device employed to compel a complete operation of the machine after the operation of the latter has been started and also to prevent backward rotation of the drive shaft 39. This device, which is omitted in Fig. 1, in general is well known in the art and consists of a ratchet 155 fast on the shaft 39 and a pawl 156 retained in engagement with the teeth of the ratchet by a spring 157. The shoulder on the pawl 156 rides idly over the teeth of the ratchet when the shaft 39 is turned in the direction of the arrow and engages behind the teeth and thereby prevents backward movement of the shaft.

*Coin chute mechanism.*

If a coin or counterfeit is inserted through one of the slots 25 and it is smaller in diameter than a coin which should be inserted into the slot through which a smaller coin or counterfeit is inserted, it drops immediately between the fingers 31, through one of the slots 42 in the plate 40 and then passes through the chute 80 and a chute 158 (Fig. 12) on to a glass plate 159 from which it may be taken by the person inserting the coin. It can therefore be seen that the machine cannot be operated to eject change by inserting a coin into the machine through the slots 25 through which the coin should not be inserted or by inserting a coin or counterfeit which is too small and should not be inserted into the machine.

Figure 13:
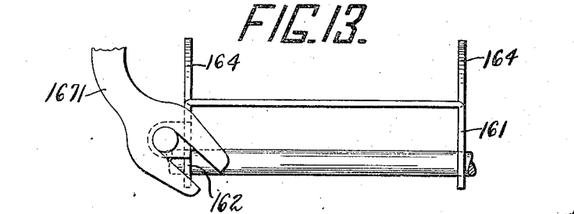
Fig. 13 is a detail side view of part of the displaying means shown in Fig. 12.

When the plate 40 is moved during the operation of the machine, as above described, to permit the inserted coin to pass through one of its slots 42 the coin passes through the chute 80, drops onto the chute 158, which has been lowered as will be described presently, and then passes onto a displaying frame or platform 160 (Figs. 12 and 13). The frame 160 has a downwardly extending arm 161 and a lever 162 integral therewith by which the frame is loosely mounted on a cross rod 163. The frame also has vertical semicircular sides 164 to prevent the coin from sliding off of the frame. The frame is positioned in a projecting portion 165 (Fig. 12) of the cabinet of the machine and under the glass plate 159, so that the coin inserted at one operation of the machine may be viewed until during the succeeding operation. The chute 80 is loosely mounted on the cross rods 41 and is fast to the plate 40. The chute 158 (Figs. 4, 12 and 16) is screwed to an inclined portion 167 of a frame 168 mounted to slide on the left hand side frame of the machine, the frame 168 being provided with slots 169 through which pins 170 on the machine side frame project. The frame 168 at its upper end carries a pin 171 projecting into the bifurcated end of the horizontal arm of a lever 172 which is loosely mounted on the forward cross bar 41. The downwardly extending arm of the lever 172 is connected by a link 173 to the arm 35 (Fig. 4). It can be seen from this construction that when the arm 35 is rocked forwardly by the cam groove shown in Fig. 15, the lever 172 is rocked clockwise, as viewed in Figs. 4 and 15, to lower the frame 168 and chute 158 so that when a coin passes through the chute 158 during the operation of the machine it will slide onto the frame 160 (Fig. 12). At the end of the operation of the machine when the arm 35 is restored to normal position as already described, the frame 168 is also raised to normal position so if a coin which is too small is inserted into the machine after the operation of the machine is completed it will slide onto the glass plate 159, as above described.

*Operation of displaying device.*

The inserted coin after being deposited on the displaying frame 160 remains thereon in displaying position until the next operation of the machine when the frame is rocked counter clockwise as viewed in Fig. 12 and then restored to normal position before the coin inserted at the particular operation is permitted to drop through one of the slots 42 in the plate 40. The counter clockwise movement of the frame 160, which is effected by mechanism to be described now, permits the coin to slide off of the frame 160 into a receptacle or drawer 167 positioned in the bottom portion of the machine under a plate 1661. The means for rocking the frame 160 comprises a lever 1671 (Figs. 12, 13 and 17). The lever 1671, as shown in Fig. 17, carries a roller projecting into a cam groove formed in the face of the ratchet wheel 155. The downwardly extending arm of the lever 1671 is slotted at its lower end and straddles a stud projecting from a flange on the end of the horizontal arm of the lever 162. The cam groove in the ratchet 155 is so constructed that during the operation of the machine and before a coin is permitted to pass through one of the slots 42 in the plate 40 the lever 1671 is rocked clockwise as viewed in Fig. 17 whereby the displaying frame 160 is rocked counter clockwise as viewed in Fig. 12 to deposit the coin in the receptacle 167, after which the displaying frame is restored to normal position.

*Alarm mechanism.*

Figure 18:
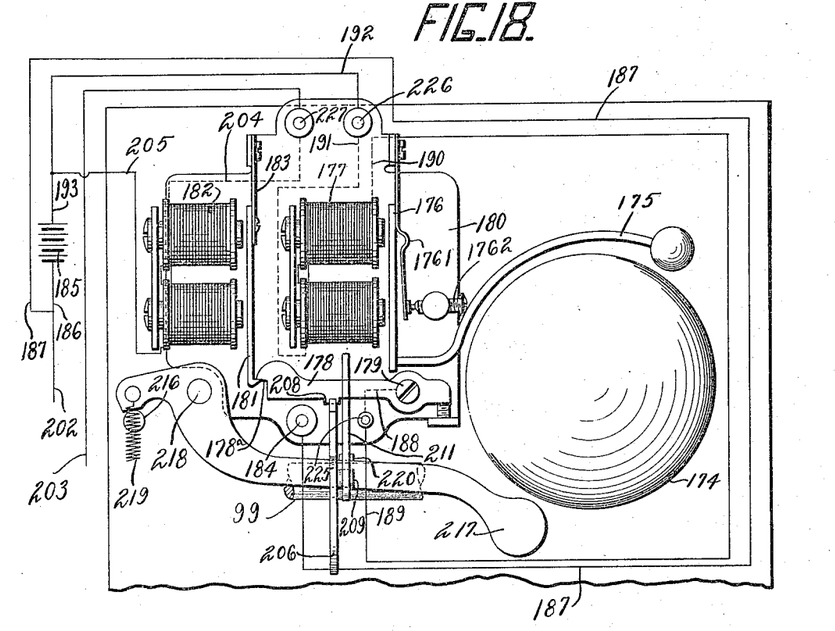
Fig. 18 is a detail view of the alarm mechanism.

As a coin or counterfeit which is smaller than the diameter of the coin which should be inserted into the slot 25 through which the smaller coin or counterfeit is inserted passes through the chute 158 it completes an electric circuit to close a second circuit including an electromagnet 177 for operating a clapper 175 for a bell 174 (Figs. 4 and 18). The bell clapper 175 (Fig. 18) is mounted on an armature 176 for the electromagnet 177. The armature 176 is mounted on a leaf spring 1761 mounted on a frame 180 supporting the magnet 177, and a set screw 1762 engaging the spring may be employed to secure the proper tension of the latter. An arm 178 is loose on a screw 179 which is mounted on but insulated from the frame 180. The arm 178 has a shoulder 178ᵃ normally resting on a shoulder formed on the lower end of an armature 181 of an electromagnet 182. The armature 181 is carried by a spring 183 mounted on the frame 180. When a coin or counterfeit which is too small passes through the chute 158 it completes a circuit, which will be described presently, to energize the magnet 182 which results in operating the armature 181 to withdraw its shoulder from under the shoulder on the arm 178 whereupon the arm 178 drops into engagement with a post 184. A circuit is thereby completed through the electromagnet 177 to operate the clapper 175. This circuit is as follows,—from a battery 185 (Fig. 18) through a wire 186, wire 187, post 184, arm 178, screw 179, wire 188, post 225, wire 189, wire 190, electromagnet 177, wire 191, post 226, wire 192 and wire 193 back to the battery.

The circuit for the electromagnet 182 will now be described. A plate 195 (Figs. 12 and 16) forming the bottom or base and the sides of the chute 158 is insulated from the frame 168 by insulating material 196. The frame 168 carries a block 197 which is insulated from the frame and the block carries a rod or pin 198 upon which is pivotally mounted a contact strip or plate 199. The pin 198 normally engages a contact strip 200 carried by a a block 201 which is insulated from and mounted upon the side frame of the machine. As a coin or counterfeit which is too small, passes through the chute 158 it engages the contact strip 199, the strip being loose on the pin 198 to permit the strip to rock so that coins of different widths may freely pass between the strip and the base of the chute. To prevent the strip 199 from touching the plate 195 an insulated pin 198ª is provided against which the strip normally rests, thus preventing a contact between the strip 199 and the plate 195. The coin or counterfeit as it passes through the chute 158 in this manner completes a circuit through the electromagnet 182 which is as follows,—from the battery 185, (Fig. 18) through the wire 186, wire 202, contact strip 200 (Fig. 16), pin 198, contact strip 199, the coin, plate 195, wire 203, post 227, wire 204 (Fig. 18) electromagnet 182, wire 205 and wire 193 back to the battery. The energizing of the magnet 182 in this manner attracts its armature 181 to permit the arm 178 to drop into engagement with the post 184 to complete the circuit through the electromagnet 177 as above described.

Figure 19:
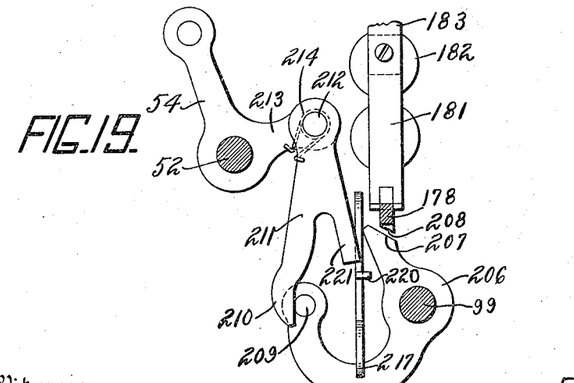
Fig. 19 is a detail view of the mechanism for operating a bell hammer during the operation of the machine and of the means for breaking the electric circuit for a bell clapper.

It can be seen that the circuit through the magnet 177 is not broken after the coin passes out of engagement with the contact strip 179 as the arm 178 remains in engagement with the post 184 and therefore the bell clapper 175 continues to operate after the operation of the machine is completed. Means are provided to break the circuit through the magnet 177 at the next operation of the machine. Referring to Figs. 18 and 19 this means includes a lever 206 rigidly mounted on the shaft 99. The upwardly extending arm of the lever 206 has an inclined edge 207 for engaging an inclined shoulder 208 on the arm 178, and the inclined edge 207 is normally out of engagement with the shoulder 208.

When the shaft 99 is rocked clockwise (Fig. 19) as above described, the lever 206 is rocked so that its inclined edge 207 engages the shoulder 208 and restores the arm 178 to normal position. As the circuit through the electromagnet 182 is broken when the coin passes out of engagement with the contact 199, it can be seen that the armature 181 is permitted to move rearwardly to normal position so that when arm 178 is raised during the next operation of the machine the shoulder on the armature 181 passes under the shoulder 178ª of the arm 178 to retain the latter in normal position. As the arm 178 is raised out of engagement with the post 184 the circuit of the electromagnet 177 is broken, whereupon the bell clapper 175 ceases to operate.

When the chute 158 is lowered during the operation of the machine as already described, the pin 198 is carried out of engagement with the contact strip 200 so that when a coin passes through the chute 158 the circuit through the electromagnet 182 cannot be completed and therefore a circuit will not be completed through the electromagnet 177. It is obvious therefore that the clapper 175 is not operated during the operation of the machine.

A bell hammer 217 (Figs. 18 and 19) is also employed to ring the bell, the hammer being operated during the operation of the machine. The hammer 217 is pivotally mounted at 218 to the rear frame of the machine and a tensioned spring 219 normally retains the hammer in the position, shown in Fig. 18, a pin 216 being engaged by the left hand end of the hammer when the latter is in normal position. The hammer has a projecting flange 220 which is normally under and out of engagement with a downwardly extending arm 221 of a member 211. The member 211 is loosely mounted on a stud 212 which is carried by a rearwardly extending arm 213 of the arm 54 supporting the rear end of the plate 48 of the pair of plates between which dollars are inserted (Figs. 1 and 19). A spring 214 coiled about the stud 212 tends to rock the member 211 rearwardly and thereby retains its arm 210 in engagement with a stud 209 on the curved arm of the lever 206. When the arm 54 is rocked clockwise the member 211 is lowered and its arm 221 engages the flange 220 on the clapper 217 thereby rocking the clapper clockwise as viewed in Fig. 18 and extending the spring 219. During the downward movement of the member 211 it is rocked clockwise by the stud 209 and the arm 221 passes out of engagement with the flange 220 whereupon the spring 219 rocks the hammer 217 counter clockwise to strike and ring the bell once.

*Operation.*

In order to operate the machine to obtain the desired change, the coin to be changed is inserted into the proper slot 25 and the crank or other operating means is operated. The cam shown in Fig. 15 rocks the lever 35 forwardly to move the plate 28 (Fig. 14) for the purpose of withdrawing the fingers 31 from under the inserted coin. Before the fingers 31 are withdrawn from under the coin the plate 40 (Figs. 1 and 4) is slid on the rods 41 so that the coin when released will not pass through a slot 42 in the plate 40. When the fingers 31 are withdrawn from under a coin the coin drops and is arrested by the plate 40, the coin being retained in a vertical position between the pair of parallel plates 47 and 48 between which the coin is inserted. The plates 48 are then moved rearwardly an invariable distance by the cam shown in Fig. 3. During this movement of the plates 48 the block 56 between the pair of plates between which the coin was inserted engages the coin and moves it rearwardly. During this rearward movement of the coin it engages the corresponding pawl 63 and rocks it to couple the plates 47 and 48 together so that the plates 47 are moved differentially dependent upon the denomination of the coin inserted. This differential movement of the plates 47 is imparted to the cam slotted arms 81 through the shaft 52, arm 86, link 85, lever 84, and shaft 82. The slots 90 in the arms 81 are so formed as to selectively couple the coin ejectors to the links 96 as fully described. After the coin ejectors are coupled to the links 96 the cam, shown in Fig. 2, through the pitman 101, arm 100, arms 98 and rod 97 moves the links 96 forwardly whereupon the coin ejectors coupled to the links 96 are operated to eject the proper change.

After the proper change has been ejected the cam, shown in Fig. 3, returns the plates 48 to normal position. During the return movement of the plates 48 the pins 57 engage the forward ends of the slots 58 in the plates 47 and thereby return the plates 47 and restore the ejecting mechanism to normal position.

Although the machine is shown and described as being a money changer yet it is obvious that the machine is equally well adapted to be controlled by checks or to issue checks and also that it may be used for issuing articles of merchandise, if desired. The machine is therefore capable of being used as a vending machine as well as for changing money without departing from the scope of the invention. It is therefore intended that the term "coin" when referring to inserted coins in the claims should have a sufficiently broad interpretation to cover checks and other tokens of value, and when referring to coins ejected as change should have a sufficiently broad interpretation to cover checks, other tokens of value and articles of merchandise.

While the form of mechanism herein shown and described is admirably adapted to fulfil the objects primarily stated, it is to be understood that it is not intended to confine the invention to the one form of embodiment herein shown and described, as it is susceptible of embodiment in various forms, all coming within the scope of the claims which follow.

What is claimed is,—

1. In a machine of the class described, the combination with a main operating mechanism, of coin ejectors, normally disconnected therefrom, connections for connecting the operating mechanism and coin ejectors, and cam means moved differentially by the main operating mechanism under the control of inserted coins for selectively connecting the coin ejectors and the operating mechanism.

2. In a machine of the class described, the combination with operating mechanism, of a plurality of coin ejectors, normally disconnected from the operating means, means for connecting the coin ejectors and the operating mechanism, and a plurality of cam devices, one for each coin ejector, moved differentially under the control of coins to operate the connections and thereby selectively connect the coin ejectors and the operating mechanism.

3. In a machine of the class described, the combination with operating mechanism, of a plurality of coin ejectors normally disconnected from the operating mechanism, means for connecting the operating mechanism and coin ejectors, and a plurality of cam devices, one for each coin ejector, moved positively and differentially under the control of coins to operate the connections and thereby connect selectively the coin ejectors and the operating mechanism.

4. In a machine of the class described, the combination with operating mechanism, of a plurality of coin ejectors normally disconnected from the operating mechanism, means for connecting the operating mechanism and the coin ejectors, and a plurality of cam devices, one for each coin ejector, moved differentially and as a unit under the control of coins to operate the connections and thereby connect selectively the coin ejectors and the operating mechanism.

5. In a machine of the class described, the combination with operating mechanism, of a plurality of coin ejectors normally disconnected from the operating mechanism, means for connecting the operating mechanism and the coin ejectors, and a plurality of cam devices, one for each coin ejector, moved positively and differentially as a unit under the control of coins to operate said connections and thereby connect selectively the coin ejectors and operating mechanism.

6. In a machine of the class described, the combination with a main operating mechanism, of coin ejectors normally disconnected therefrom, connections for connecting the coin ejectors and the operating mechanism, and cam means moved differentially and positively under the control of coins for operating the connections and thereby selectively connecting the coin ejectors and operating mechanism.

7. In a machine of the class described, the combination with operating mechanism, of coin ejectors normally disconnected therefrom, differentially movable cam means for selectively connecting the coin ejectors with the operating mechanism, and mechanism operated by the operating mechanism for moving inserted coins to operate said cam means.

8. In a machine of the class described, the combination with a plurality of pairs of parallel plates, of a shaft to which a plate of each pair is positively connected, a shaft to which the other plate of each pair is positively connected, and means for rocking the first mentioned shaft an invariable extent whereby the plates positively connected thereto are moved an invariable extent and the other plates and the second mentioned shaft are moved differentially through the inserted coins which connect together the plates between which the coins are inserted.

9. In a machine of the class described, the combination with a plurality of pairs of parallel plates, of a shaft to which a plate of each pair is positively connected, a shaft to which the other plate of each pair is positively connected, means for rocking the first mentioned shaft an invariable distance whereby the plates positively connected thereto are moved an invariable extent and the other plates and the second mentioned shaft are moved differentially through inserted coins which connect the plates between which the coins are inserted, coin ejectors, operating means for selectively operating the coin ejectors, and connections intermediate said differentially movable shaft and said operating means whereby the latter is caused to operate selectively the coin ejectors.

10. In a machine of the class described, the combination with a plurality of pairs of parallel plates, of a shaft to which a plate of each pair is positively connected, a shaft to which the other plate of each pair is positively connected, means for rocking the first mentioned shaft an invariable distance whereby the plates positively connected thereto are moved an invariable extent and the other plates and the second mentioned shaft are moved differentially through inserted coins, which connect the plates between which they are inserted, coin ejectors, operating means for selectively operating the coin ejectors, and cam means positively connected to said differentially movable shaft for causing the operating mechanism to operate selectively the operating mechanism.

11. In a machine of the class described, the combination with a plurality of pairs of members, one pair being provided for each denomination of coins insertible into the machine, of means for moving one member of each pair an invariable distance, the other member of each pair being moved differentially under the control of coins inserted into the machine, coin ejectors, operating means for the coin ejectors normally disconnected therefrom, and connections intermediate said differentially movable members and said operating means whereby the coin ejectors are selectively connected to the operating means.

12. In a machine of the class described, the combination with a plurality of pairs of members, one pair being provided for each denomination of coins insertible into the machine and the members of each pair being connected together positively by the coins inserted between the same, of operating means for moving a member of each of said pairs an invariable extent whereby the other member of each pair is moved differentially through the inserted coin, coin ejectors, operating means for the coin ejectors normally disconnected therefrom, and connections intermediate said differentially movable members and said operating means whereby the coin ejectors are selectively connected to the operating means.

13. In a machine of the class described, the combination with a main operating mechanism, of coin ejectors, normally disconnected therefrom, cam means moved differentially under the control of inserted coins for selectively connecting the coin ejectors and the operating mechanism and means operated by the coins for preventing overthrow of said cam means.

14. In a machine of the class described, the combination with operating mechanism, of coin ejectors normally disconnected therefrom, means for selectively connecting the coin ejectors with the operating mechanism, mechanism for moving inserted coins to operate said selecting means and means operated by the coins for preventing overthrow of said selecting means.

15. In a machine of the class described, the combination with operating mechanism, of coin ejectors normally disconnected therefrom, means for selectively connecting the coin ejectors with the operating mechanism, mechanism for moving inserted coins positively to operate said selecting means and means controlled by the coins for preventing overthrow of said selecting means.

16. In a machine of the class described, the combination with a main operating mechanism, of coin ejectors, selectively operated thereby, cam means moved differentially under the control of coins for selecting the coin ejectors to be operated and means controlled by the coins for preventing overthrow of said cam means.

17. In a machine of the class described, the combination with a plurality of pairs of members one pair being provided for each denomination of coins insertible into the machine, of means for moving one member of each pair an invariable distance, the other member of each pair being moved differentially under the control of coins inserted into the machine and means controlled by the coins for locking the members of the pairs together during the differential movement of the differentially movable members.

18. In a machine of the class described, the combination with a plurality of pairs of members one pair being provided for each denomination of coins insertible into the machine, of means for moving one member of each pair an invariable distance, the other member of each pair being moved differentially under the control of coins inserted into the machine and means positively operated by the coins for locking the members of the pairs together during the differential movement of the differentially movable members.

19. In a machine of the class described, the combination with a plurality of pairs of members, of means for moving one member of each pair an invariable distance, the other member of each pair being moved differentially under the control of coins inserted into the machine, means operated by the inserted coins for locking the members of the pairs together during the differential movement of the differentially movable members, coin ejectors, operating means for selectively operating the coin ejectors, and connections intermediate said differentially movable members and said operating means whereby the latter is caused to operate selectively the coin ejectors.

20. In a machine of the class described, the combination with a main operating mechanism, of coin ejectors, normally disconnected therefrom, means moved differentially under the control of inserted coins for selectively connecting the coin ejectors and the operating mechanism, means normally locking the selecting means against movement, and means operated by the coins for disabling said locking means.

21. In a machine of the class described, the combination with a main operating mechanism, of coin ejectors, normally disconnected therefrom, means moved differentially under the control of inserted coins for selectively connecting the coin ejectors and the operating mechanism, means normally locking the selecting means against movement, and means controlled by the coins for disabling said locking means and preventing overthrow of said selecting means.

22. In a machine of the class described, the combination with a main operating mechanism, of coin ejectors, selectively operated thereby, means moved differentially under the control of coins for selecting the coin ejectors to be operated, means normally locking the selecting means against movement, and means controlled by the coins for disabling said locking means and for preventing overthrow of said selecting means.

23. In a machine of the class described, the combination with a plurality of pairs of members, one pair being provided for each denomination of coins insertible into the machine, of means for moving one member of each pair an invariable distance, the other member of each pair being moved differentially under the control of coins inserted into the machine, means normally locking the differentially movable members against operation, and means controlled by the coins for disabling said locking means, and for locking the members of the pairs together during the differential movement of the differentially movable members.

In testimony whereof I affix my signature in the presence of two witnesses.

FRANCESCO SKERL.

Witnesses:
F. E. HAMILTON,
J. B. RICKETTS.

Copies of this patent may be obtained for five cents each, by addressing the "Commissioner of Patents, Washington, D. C."

It is hereby certified that in Letters Patent No. 1,279,598, granted September 24, 1918, upon the application of Francesco Skerl, of Dayton, Ohio, for an improvement in "Money-Changers," an error appears in the printed specification requiring correction as follows: Page 6, line 102, strike out the words "to return the plates 48" and insert the words *operated and returned;* and that the said Letters Patent should be read with this correction therein that the same may conform to the record of the case in the Patent Office.

Signed and sealed this 22d day of October, A. D., 1918.

[SEAL.]

R. F. WHITEHEAD,

*Acting Commissioner of Patents.*

Cl. 133—4.